(12) United States Patent  
Krishnakumar et al.

(10) Patent No.: US 8,686,975 B2  
(45) Date of Patent: Apr. 1, 2014

(54) INTERACTIVE PROJECTOR DEVICE

(75) Inventors: Karthikeyan Krishnakumar, Round Rock, TX (US); Samuel D'Alessio, Round Rock, TX (US); Thomas Pratt, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 326 days.

(21) Appl. No.: 12/845,927

(22) Filed: Jul. 29, 2010

(65) Prior Publication Data

US 2012/0026078 A1   Feb. 2, 2012

(51) Int. Cl.  
G06F 3/033  (2013.01)

(52) U.S. Cl.  
USPC .......................................................... 345/179

(58) Field of Classification Search  
USPC .................................. 345/179–183; 353/122  
See application file for complete search history.

(56) References Cited

U.S. PATENT DOCUMENTS

| | | |
|---|---|---|
| 4,670,751 A | 6/1987 | Enokido et al. |
| 4,711,977 A | 12/1987 | Miyamori et al. |
| 5,134,388 A | 7/1992 | Murakami et al. |
| 5,341,155 A * | 8/1994 | Elrod et al. ................... 345/179 |
| 6,710,754 B2 * | 3/2004 | Hanson et al. ................. 345/2.1 |
| 2003/0017846 A1 * | 1/2003 | Estevez et al. ................ 455/556 |
| 2004/0246240 A1 * | 12/2004 | Kolmykov-Zotov et al. . 345/179 |
| 2005/0117073 A1 | 6/2005 | Payne et al. |
| 2007/0188475 A1 | 8/2007 | Tamura |
| 2009/0295723 A1 | 12/2009 | Oakley et al. |

* cited by examiner

*Primary Examiner* — Alexander Eisen  
*Assistant Examiner* — Mark Regn  
(74) *Attorney, Agent, or Firm* — Larson Newman, LLP

(57) ABSTRACT

An interactive device includes a first sensor, a first button, an accelerometer, a processor, and a transmitter. The first sensor is configured to receive coordinate information from a coordinate projection of a projector. The first button is configured to transmit an erase signal when the first button is pressed. The accelerometer is configured to provide angle information for the interactive device. The processor is in communication with the first sensor, with the first button, and with the accelerometer. The processor configured to receive the coordinate information from the first sensor, to receive the erase signal from the first button, to receive the angle information from the accelerometer, and to generate erase information based on the coordinate information, the erase signal, and the angle information. The transmitter is in communication with the processor, and is configured to transmit a delete request including the erase information received from the processor to the projector.

19 Claims, 9 Drawing Sheets

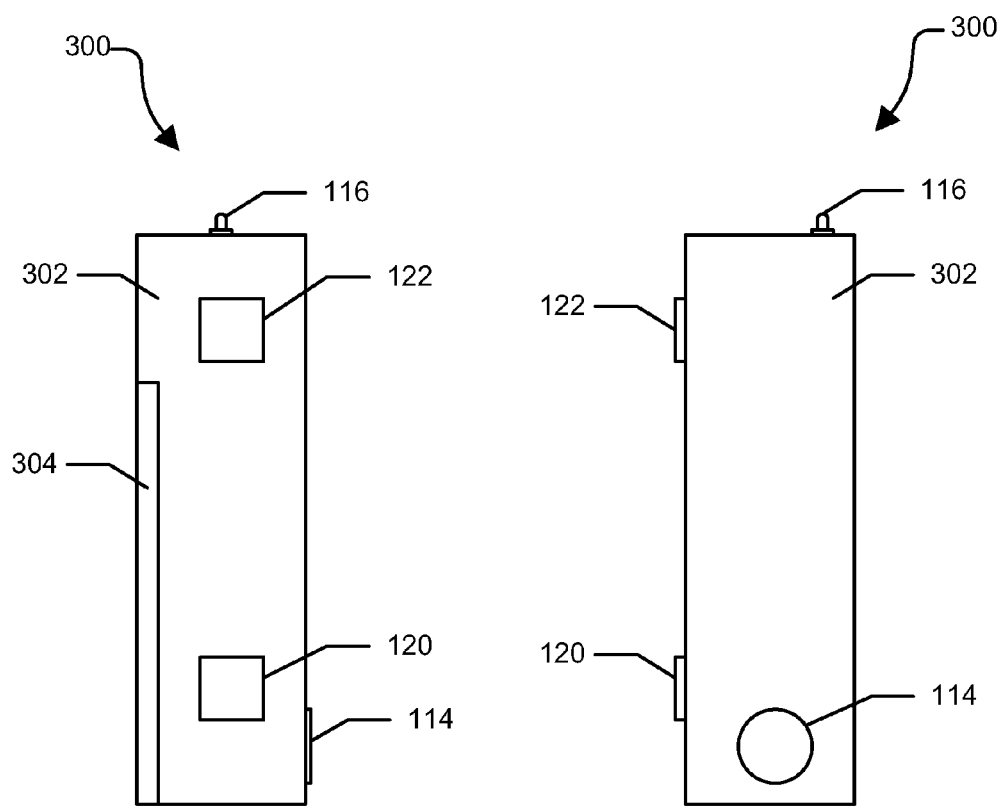
*FIG. 3*  *FIG. 4*

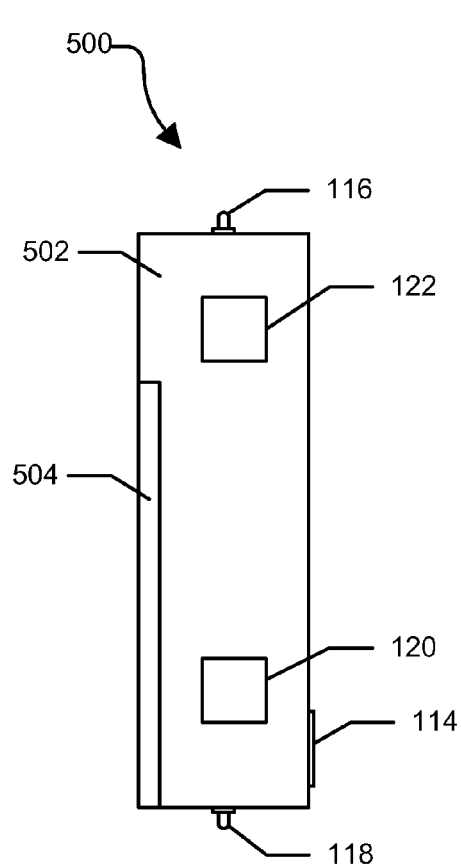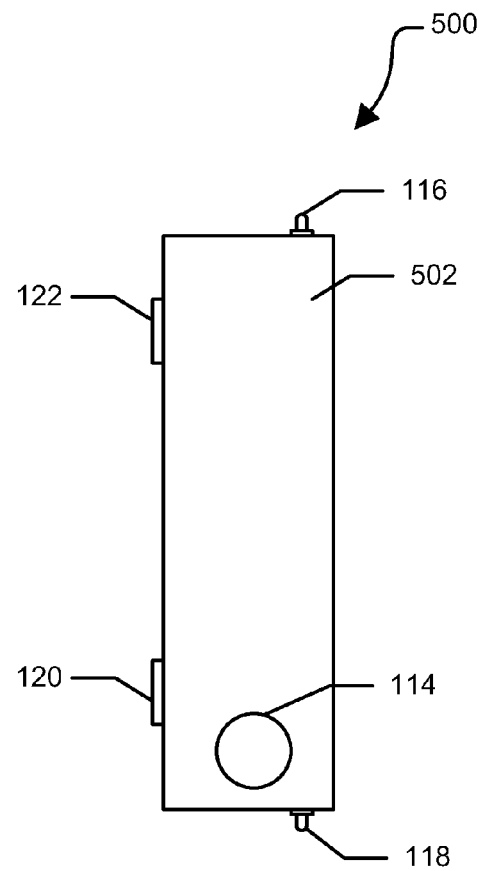
*FIG. 5*          *FIG. 6*

INTERACTIVE PROJECTOR DEVICE

FIELD OF THE DISCLOSURE

This disclosure relates generally to information handling systems, and more particularly relates to an interactive projector device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An interactive projector can allow a user to interact with a display or image by utilizing a pen. The pen can enable the user to write, highlight, or draw on the screen by interacting with software on the interactive projector. The projector can project grid patterns of pixels on the screen that are invisible to an individual. The pen can have a sensor that captures a small grid of pixels corresponding to a location on the screen, and the pen can communicate the location to the projector. The projector can then place a pointer on screen at the location received from the pen.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 3 and 4 are perspective diagrams of an interactive projector writer/eraser;

FIGS. 5 and 6 are diagrams of an alternative embodiment of the interactive projector writer/eraser;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
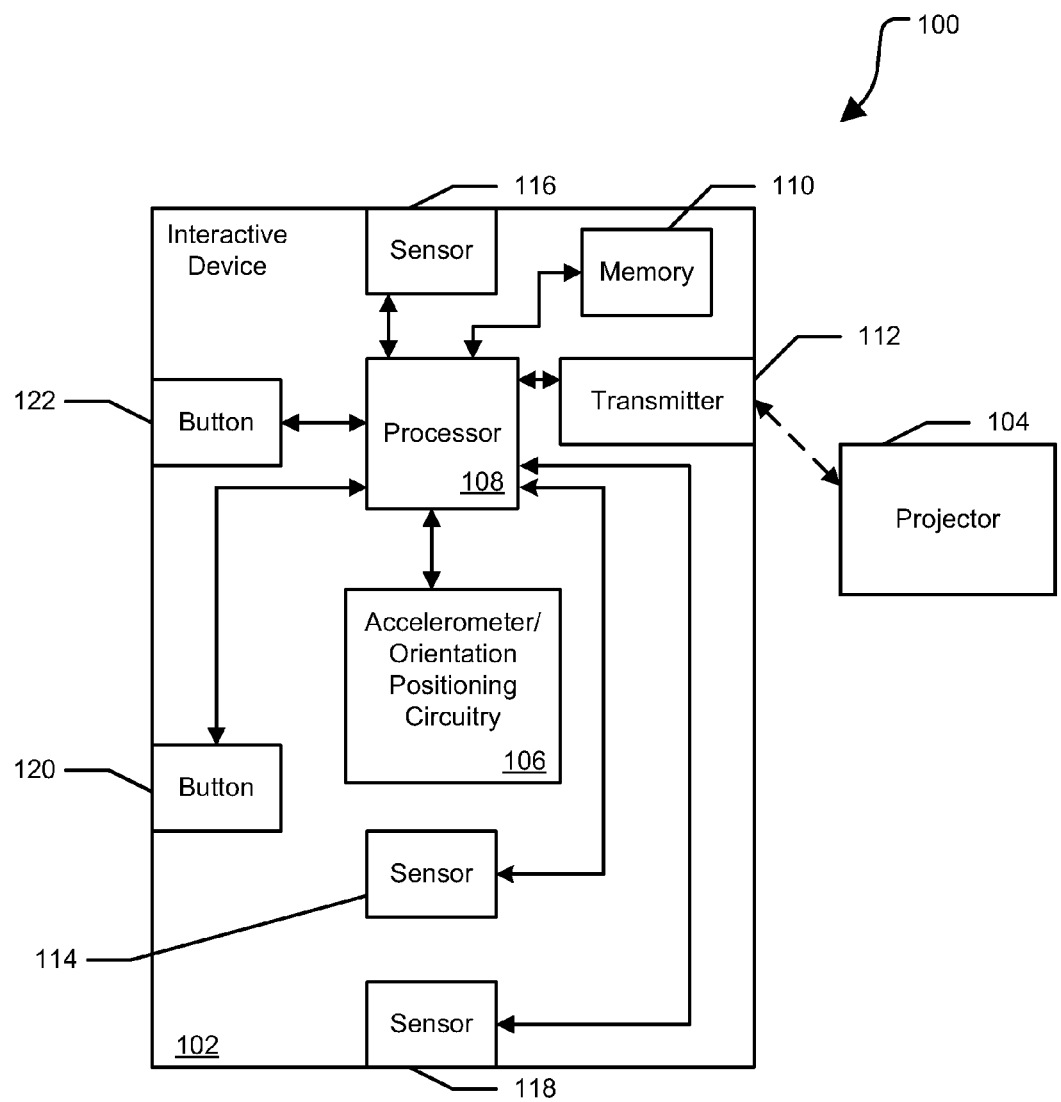
FIG. 1 is a block diagram of an interactive projector system.

FIG. 1 shows an interactive projector system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The interactive projector system 100 includes an interactive device 102 and a projector 104. The interactive device 102 includes an accelerometer 106, a processor 108, a memory 110, a transmitter 112, sensors 114, 116, and 118, and buttons 120 and 122. The accelerometer or orientation positioning circuitry 106 is in communication with the processor 108, which in turn is in communication with the memory 110, the transmitter 112, the sensors 114, 116, and 118, and the buttons 120 and 122. The transmitter 112 is in communication with the projector 104. The communication between the transmitter 112 and the projector 104 is preferably a wireless communication, such as an 802.11 wireless Internet Protocol (IP) communication. The interactive device 102 may be an interactive projector eraser, an interactive projector writer/eraser, or the like. The orientation positioning circuitry can be an accelerometer, a gyroscope, or a combination of an accelerometer and a gyroscope.

Figure 2:
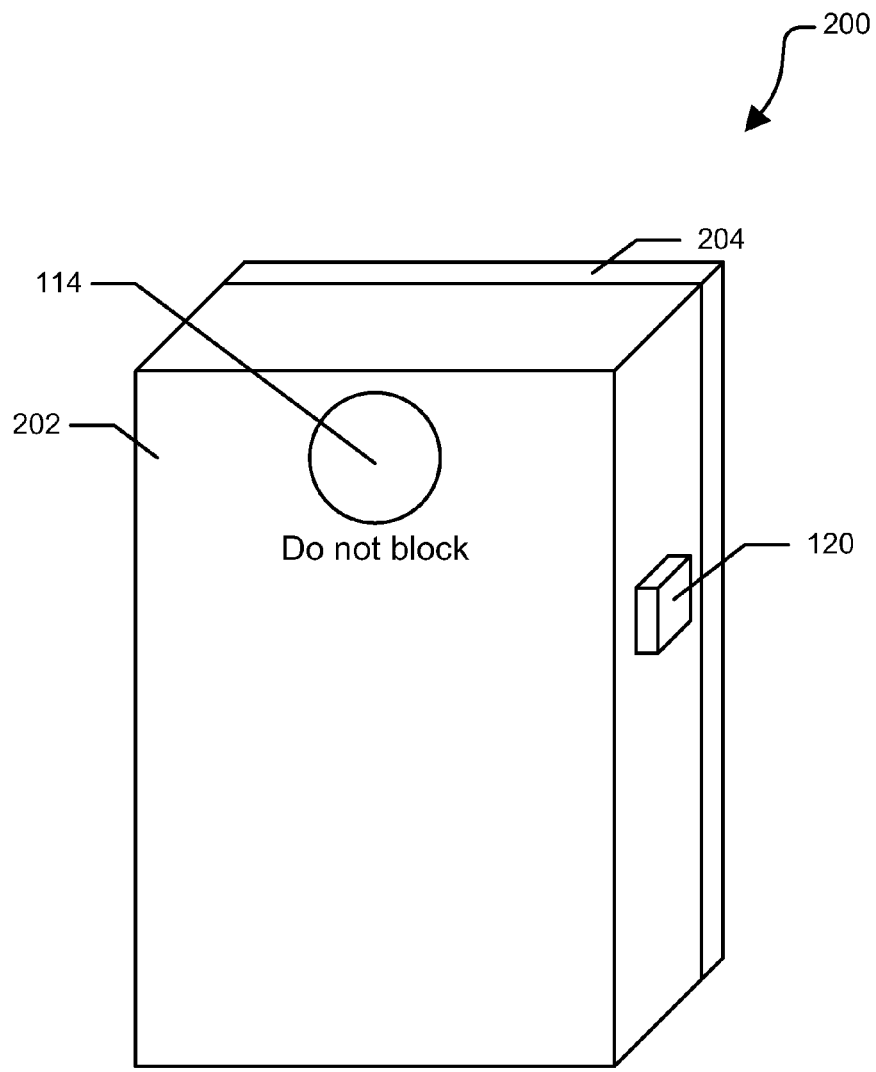
FIG. 2 is a perspective diagram of an interactive projector eraser.

In an embodiment, the interactive device 102 can be an interactive projector eraser 200 as shown in FIG. 2. The interactive projector eraser 200 includes the accelerometer 106, the processor 108, the memory 110, the transmitter 112, the sensor 114, and the button 120. The exterior of the interactive projector eraser 200 can include a body having a first surface 202, a second surface 204, the sensor 114, and the button 120. The accelerometer 106 can be a two axis accelerometer, such that the accelerometer can provide detailed angle information associated with the interactive projector eraser 200. The accelerometer 106 can determine whether the interactive projector eraser 200 is in a vertical orientation, a horizontal orientation, or at any angle in between for each axis of the accelerometer. The accelerometer 106 can send the angle information to the processor 108. When the angle information is received at the processor 108, the angle information can be temporarily cached by the processor in the memory 110 for later access by the processor. When new angle information is received at the processor 108, the cached angle information can then be replaced by the new angle information from the accelerometer 106. Alternatively, the accelerometer 106 can continuously determine the angle information, but only send the angle information to the processor 108 in response to a request for the angle information from the processor.

The sensor 114 can be an optical sensor, such that the sensor can receive coordinate information of a coordinate grid projected onto a surface by the projector 104. The coordinate grid can be an optical grid that is output along with the display image. The optical grid can be invisible to the user, such that the coordinate grid does not interfere with the viewing of the display image from the projector 104. The coordinate grid can provide the interactive device 102 with positioning information for determining the location of the interactive device within the coordinate grid. The sensor 114 can continually receive the coordinate information, and can send the coordinate information to the processor 108. The coordinate information then can be temporarily cached in the memory 110 for later access by the processor 108. Alternatively, the sensor 114 can continuously determine the coordinate information, but can send the coordinate information to the processor 108 in response to a request for the coordinate information from the processor. The second surface 204 can be a felt surface or the like, such that a user may know a proper orientation for the interactive device 100 with respect to the projection surface and the projector 104. Thus, as the user holds the second surface 204 in physical communication with or proximate to the display surface of the projection from the projector 104, the sensor 114 can be positioned in a manner that the sensor can receive the light from the coordinate grid to retrieve the coordinate information. In another embodiment, the coordinate grid and the sensor 114 can be infrared, ultrasonic, or the like.

The button 120 is shown as a physical button, however in another embodiment the button can be a soft button shown on a display screen of the interactive projector eraser 200. In this embodiment, the soft button can be pressed in response to contact with the location of the soft button on the display screen, such as from the pressure or capacitance of a finger or the like. When the button 120 is pressed, an erase signal can be sent from the button to the processor 108, which in turn retrieves the current coordinate information and the current angle information from the memory 110. Alternatively, when the processor 108 receives the erase signal, the processor can retrieve the current coordinate information directly from the sensor 114 and the current angle information directly from the accelerometer 106. The processor 108 can then utilize the coordinate information and the angle information to create an erase request, which the processor can send to the transmitter 112 for transmission to the projector 104. When the projector 104 receives the erase request, the projector can determine size, shape, and location of the projection to erase based on the coordinate information and the angle information within the erase request. Thus, if the button 120 is continually pressed, the processor 108 can continually send erase requests to the projector 104 via the transmitter 112, and each erase request may have different coordinate information and different angle information. Therefore, as the user moves the interactive projector eraser 200 across the projection with the button 120 continually depressed, the interactive projector eraser can send multiple erase requests to the projector 104, which in turn removes items from the projection based on the coordinate information and the angle information included in the erase requests.

In another embodiment, the interactive device 102 can be an interactive projector writer/eraser 300 as shown in FIGS. 3 and 4. The interactive projector writer/eraser 300 includes the accelerometer 106, the processor 108, the memory 110, the transmitter 112, the sensors 114 and 116, and the buttons 120 and 122. The exterior of the interactive projector writer/eraser 300 includes a body having a first surface 302, a second surface 304, the sensors 114 and 116, and the buttons 120 and 122.

The operation of the interactive projector writer/eraser 300 can be discussed with reference to FIGS. 1, 3, and 4. The accelerometer 106, the sensor 114, and the button 120 can each operate as discussed above with respect to FIGS. 1 and 2. The sensor 116 can be an optical sensor, and can extend from the first surface 302, such that the user can place the sensor in physical communication with the projection surface similar to a pencil or a pen. The sensor 116 can receive the light from the coordinate grid as the light is reflected off the projection surface. The sensor 116 can determine the coordinate information of the coordinate grid at a particular location of the sensor similar to the sensor 114. The sensor 116 can continuously send the coordinate information to the processor 108, or can send the coordinate information to the processor in response to a request from the processor. The second surface 304 can be a felt surface or the like, such that a user may know a proper orientation of the interactive device 100 with respect to the projection surface and the projector 104. Thus, as the user holds the second surface 304 in physical communication with or proximate to the display surface of the projection from the projector 104, the sensor 114 can be positioned in a manner that the sensor can receive the light from the projector to retrieve the coordinate information.

When the button 122 is pressed, a write signal is sent from the button to the processor 108, which in turn retrieves the current coordinate information from the sensor 116. The processor 108 can then utilize the coordinate information to create a write request, which the processor can send to the transmitter 112 for transmission to the projector 104. When the projector 104 receives the write request, the projector can determine size, shape, and location of an addition to the projection based on the coordinate information. Thus, if the button 122 is continually depressed, the processor 108 can continually send write requests to the projector 104 via the transmitter 112, and the write requests can include different coordinate information. Therefore, as the user moves the interactive projector writer/eraser 300 across the projection with the button 122 continually depressed, the interactive projector writer/eraser can send write requests to the projector 104, which in turn adds items to projection based on the coordinate information included in the write requests. Additionally, the sensor 116 can be partially pressed into the first surface 302, and in response the sensor can create a write signal and send the write signal to the processor 108.

In another embodiment, the interactive device 102 can be an interactive projector writer/eraser 500 as shown in FIGS. 5 and 6. The interactive projector writer/eraser 500 includes the accelerometer 106, the processor 108, the memory 110, the transmitter 112, the sensors 114, 116, and 118, and the buttons 120 and 122. The exterior of the interactive projector writer/eraser 500 includes a body having a first surface 502, a second surface 504, the sensors 114, 116, and 118, and the buttons 120 and 122.

The accelerometer 106, the sensors 114 and 116, and the buttons 120 and 122 can each operate as discussed above with respect to FIGS. 1-4. The sensor 118 can be an optical sensor, such that the sensor can receive coordinate information from the coordinate grid projected onto the surface similar to the sensor 116. The sensor 118 can receive the light from the coordinate grid as the light is reflected off the projection surface. Thus, the sensor 118 can determine the coordinate information of the coordinate grid at a particular location of the sensor similar to the sensor 116. The sensor 118 can continuously send the coordinate information to the processor 108, or can send the coordinate information to the processor in response to a request from the processor. The sensor 118 can be partially pressed into the first surface 302, and in response the sensor can create an erase signal and send the erase signal to the processor 108.

When the processor 108 receives the erase signal from the sensor 118, the processor can retrieve the current coordinate information from the sensor. The processor 108 can then utilize the coordinate information to create an erase request, which the processor can send to the transmitter 112 for transmission to the projector 104. Thus, if the sensor 118 is continually depressed, the processor 108 can continually send erase requests to the projector 104 via the transmitter 112, and each erase request may have different coordinate information. Therefore, as the user moves the interactive projector eraser 200 across the projection with the sensor 118 continually depressed, the interactive projector eraser can send multiple erase requests to the projector 104, which in turn removes items from the projection based on the coordinate information in the erase requests.

In an embodiment, when a write signal is received from the sensor 116 or the button 122, or an erase signal is received from the sensor 118, the processor 108 can retrieve the angle information from the accelerometer 106 and include the angle information in a write request or an erase request. In another embodiment, the interactive projector writer/eraser 500 can exclude the surface 504, such that the sensor 116 is utilized for write request, and the sensor 118 is utilized for erase request.

Figure 7:
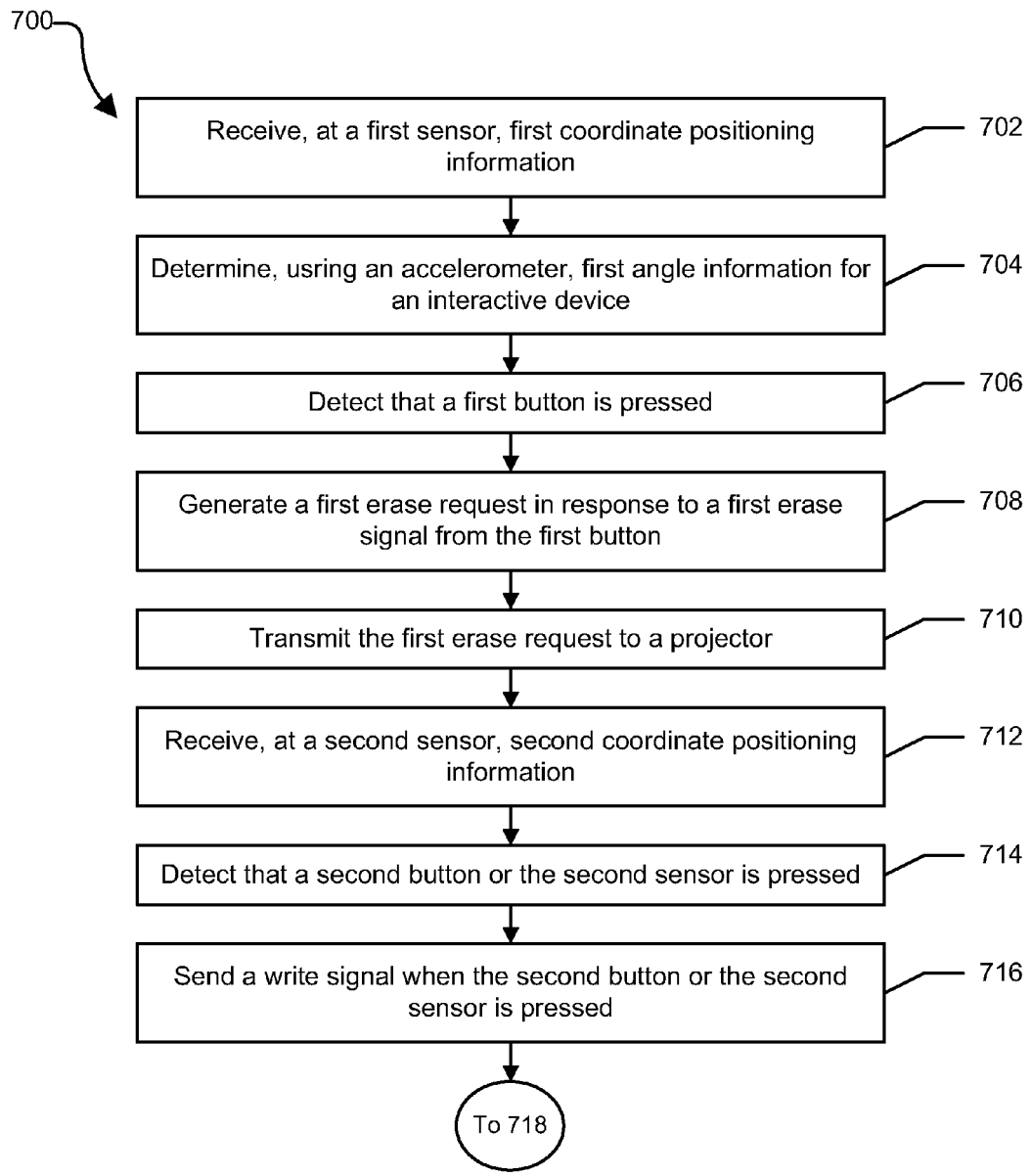
FIGS. 7 and 8 are a flow diagram of a method for implementing an interactive device for the interactive projector system.
Figure 8:
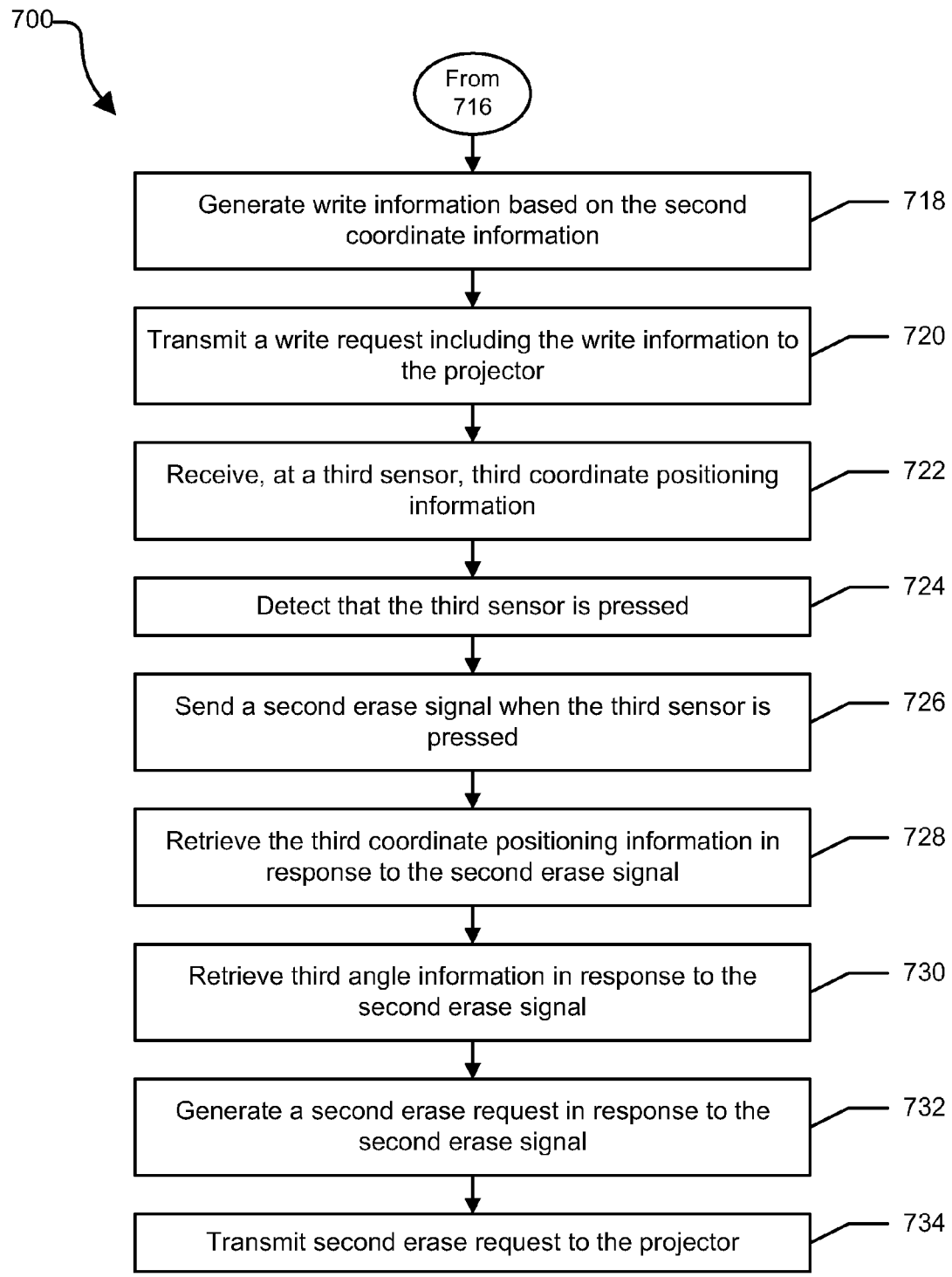

FIGS. 7 and 8 show a flow diagram of a method 700 for implementing an interactive device for the interactive projector system. At block 702, first coordinate positioning information is received from a coordinate grid projected from a projector at a first sensor. First angle information for the interactive device is determined using an accelerometer at block 704. At block 706, a first button is detected as being pressed. The first button is associated with a first erase signal. A first erase request is generated in response to receiving the first erase signal from the first button at block 708. The first erase request can include the first coordinate positioning information and the first angle information. At block 710, the first erase request is transmitted to a projector.

At block 712, second coordinate positioning information is received from the coordinate grid projected from the projector at a second sensor. The second sensor can be a nib extending from an end of the interactive device. At block 714, a second button and/or the second sensor are detected as being pressed. A write signal is sent when the second button or the second sensor are pressed at block 716. At block 718, a write information is generated based on the second coordinate positioning information and the second angle information. A write request including the write information is transmitted to a projector at block 720.

At block 722, third coordinate positioning information is received at a third sensor. The third sensor can be a nib extending from an end of the interactive device. The third sensor is detected as being pressed at block 724. At block 726, a second erase signal is sent when the third sensor is pressed.

The third coordinate positioning information is retrieved in response to the second erase signal at block 728. At block 730, third angle information is retrieved in response to the second erase signal. At block 732, a second erase request is generated. The second erase request includes the third coordinate positioning information and the third angle information. The second erase request is transmitted to the projector at block 734.

Figure 9:
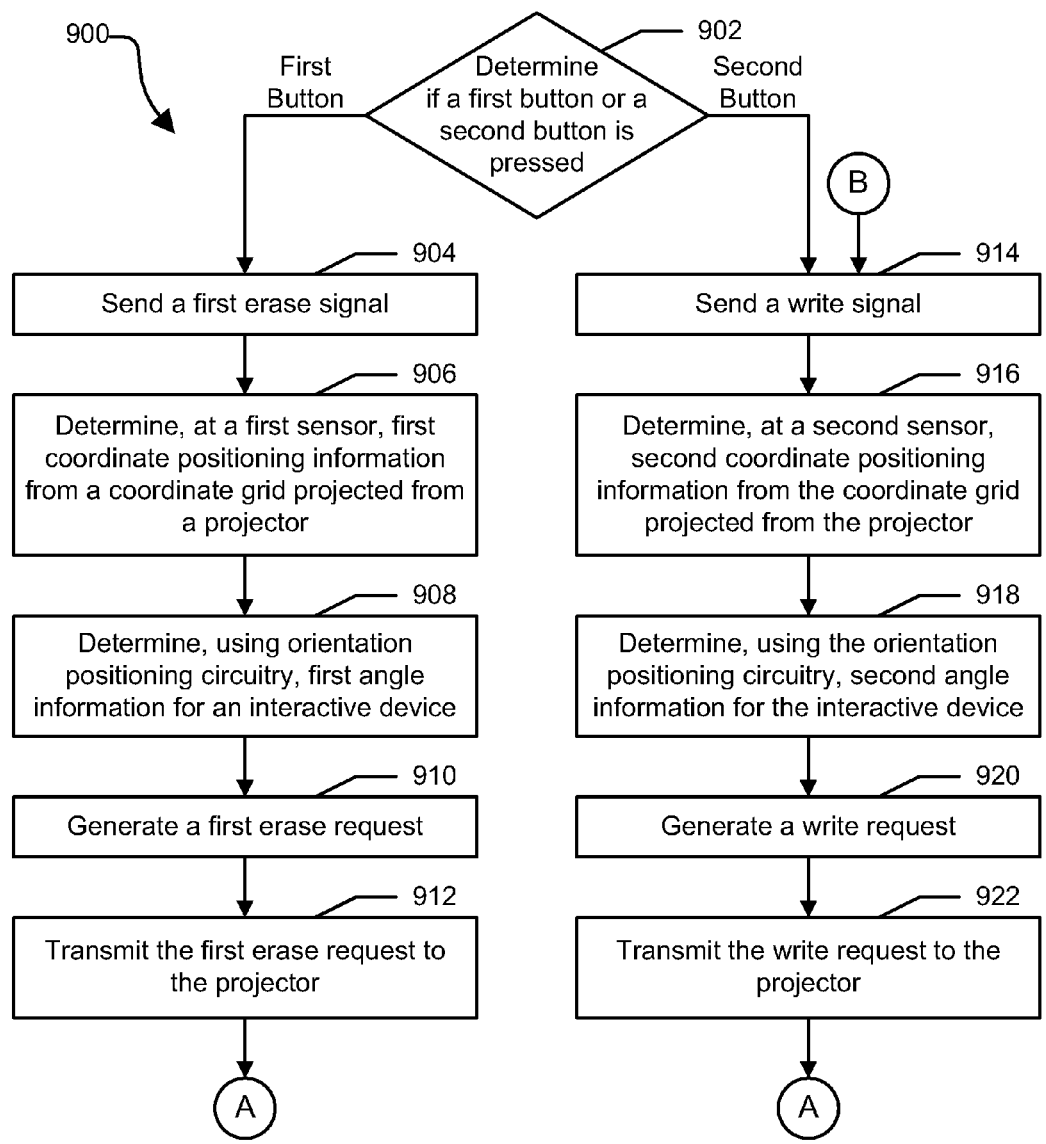
FIGS. 9 and 10 are a flow diagram of an alternative method for implementing an interactive device for the interactive projector system.
Figure 10:
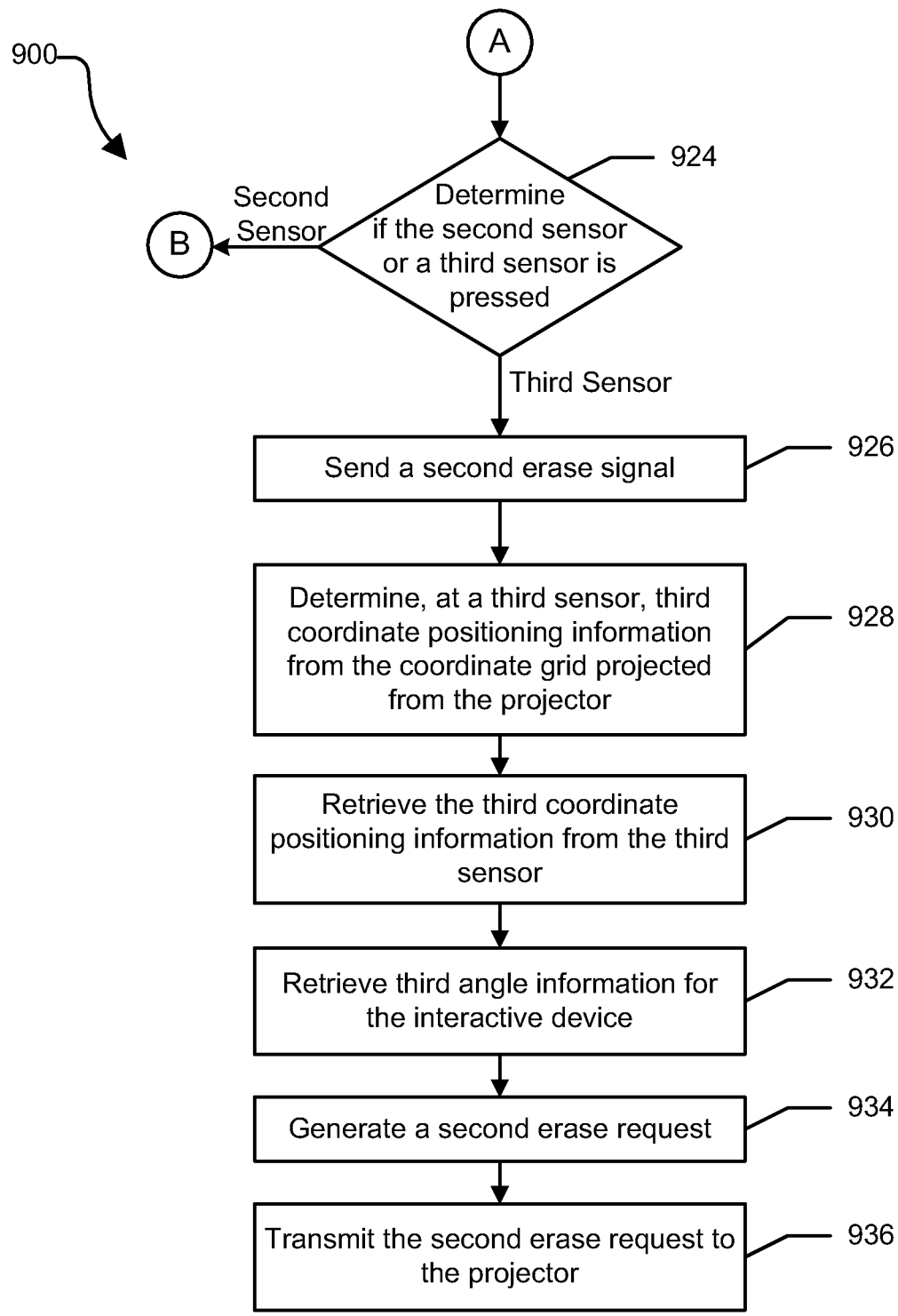

FIGS. 9 and 10 show a flow diagram of another method 900 for implementing an interactive device for the interactive projector system. At block 902, a determination is made whether a first button or a second button is pressed. If the first button is pressed, a first erase signal is sent at block 904. At block 906, first coordinate positioning information is determined from a coordinate grid projected from a projector at a first sensor. First angle information is determined using orientation positioning circuitry for the interactive device at block 908. The orientation positioning circuitry can be an accelerometer, a gyroscope, or a combination of an accelerometer and a gyroscope. At block 910, a first erase request is generated. The first erase request includes the first coordinate positioning information and the first angle information. At block 912, the first erase request is transmitted to the projector and the flow diagram continues at block 924.

However, if the second button is pressed, a write signal is sent at block 914. At block 916, second coordinate positioning information is determined from the coordinate grid projected from the projector at a second sensor. Second angle information is determined using the orientation positioning circuitry for the interactive device at block 918. At block 920, a write request is generated. The write request includes the second coordinate positioning information and the second angle information. At block 922, the write request is transmitted to the projector and the flow diagram continues at block 924.

At block 924, a determination is made whether the second sensor or a third sensor is pressed. If the second sensor is pressed, the flow diagram continues as stated above at block 914. However, if the third sensor is pressed, a second erase signal is sent at block 926. At block 928, third coordinate positioning information is determined from the coordinate grid projected from the projector at the third sensor. At block 930, the third coordinate positioning information is retrieved from the third sensor. Third angle information is determined using the orientation positioning circuitry for the interactive device at block 932. At block 934, a second erase request is generated. The second erase request includes the third coordinate positioning information and the third angle information. At block 936, the second erase request is transmitted to the projector.

Figure 11:
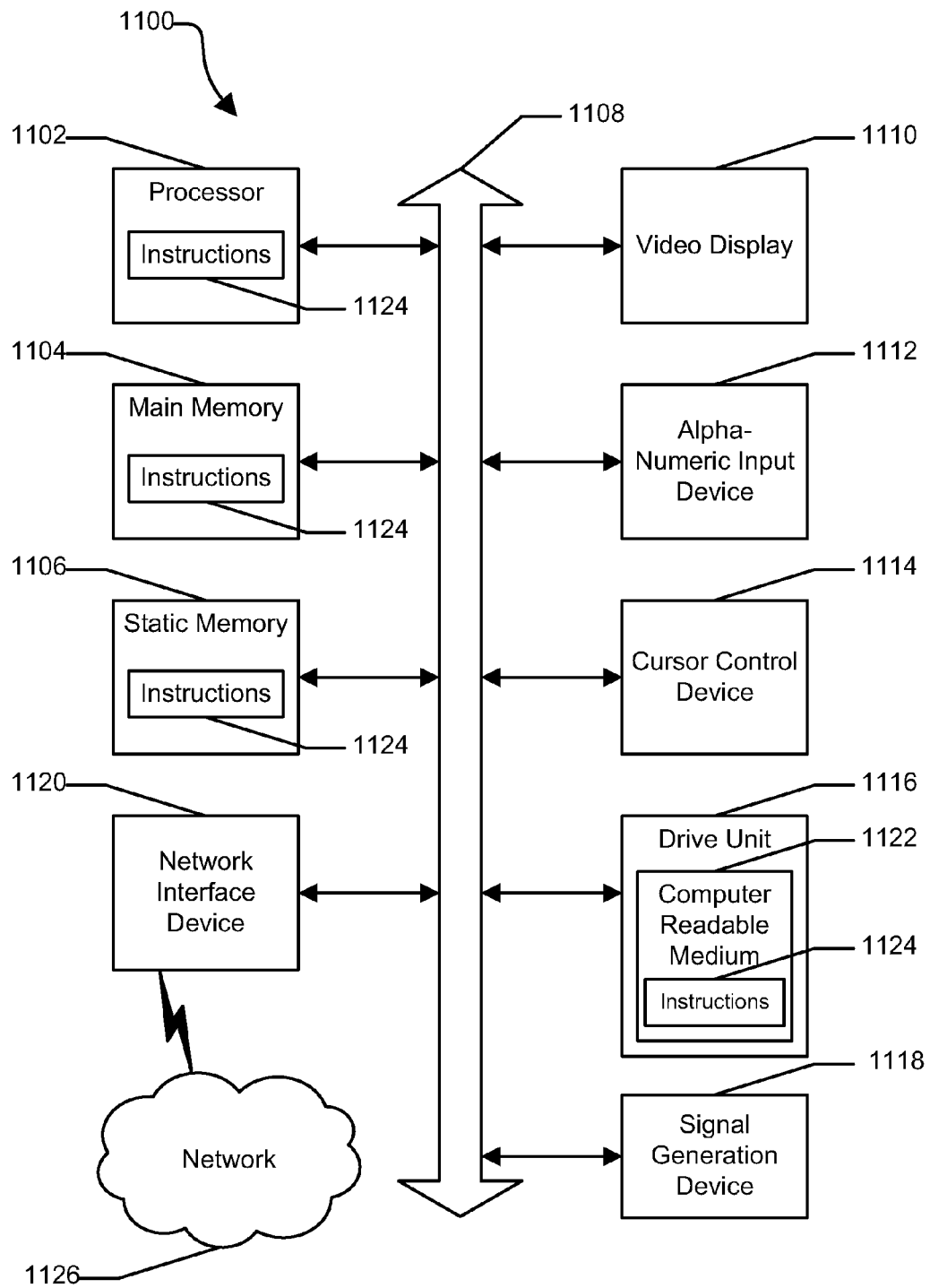
FIG. 11 is a block diagram of a general computer system.

FIG. 11 shows an illustrative embodiment of a general computer system 1100 in accordance with at least one embodiment of the present disclosure. The computer system 1100 can include a set of instructions that can be executed to cause the computer system to perform any one or more of the methods or computer based functions disclosed herein. The computer system 1100 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102 such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124 such as software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An interactive device comprising:
   a first sensor configured to receive coordinate information from a coordinate projection received directly from a projector;
   a first button configured to transmit a first erase signal when the first button is pressed;
   a second sensor configured to be placed in physical communication with a projection surface, and to receive second coordinate information from the coordinate projection of the projector reflected off the projection surface, and to transmit second coordinate information when the second sensor is pressed, wherein the second sensor is a nib extending from the interactive device;
   an accelerometer configured to provide angle information of the interactive device;
   a processor in communication with the first sensor, with the first button, with the second sensor, and with the accelerometer, the processor configured to receive the coordinate information from the first sensor, to receive the erase signal from the first button, to receive the angle information from the accelerometer, to generate first erase information based on the coordinate information, the first erase signal, and the angle information, and to generate a second erase signal based on the second coordinate information from the second sensor, wherein the first erase information is continually updated by the processor in response to the first button being continually pressed and the interactive device being moved within the coordinate projection; and a transmitter in communication with the processor, the transmitter configured to transmit, via a wireless data communication, a first delete request including the first erase information received from the processor to the projector, and a second delete request including the second erase information, wherein the transmitter is configured to continually transmit, via the wireless data communication, the first delete request including the continually updated erase information in response to the first button being continually pressed and the interactive device being moved within the coordinate projection, and wherein images projected at locations identified in the continually updated erase information are no longer projected after the first erase information and second erase information are received at the projector.

2. The interactive device of claim 1 further comprising:
a third sensor to receive the coordinate information from the coordinate projection of the projector; and
a second button to send a write signal to the processor when the second button is pressed.

3. The interactive device of claim 2 wherein the processor is further configured to receive the coordinate information from the third sensor, to receive the write signal from the second button, and to generate write information based on the coordinate information and the write signal.

4. The interactive device of claim 3 wherein the transmitter is further configured to transmit a write request including the write information received from the processor to the projector.

5. The interactive device of claim 3 wherein the first button is a soft button.

6. The interactive device of claim 1 further comprising:
a body including:
a first surface including the first sensor; and
a second surface different from the first surface, the second surface being opposite of the first sensor on the interactive device, and the second surface indicating an erasing position of the interactive device.

7. The interactive device of claim 6 wherein the second surface is a felt surface.

8. A method for implementing an interactive device within an interactive projector system, the method comprising:
receiving, at a first sensor, first coordinate positioning information from a coordinate grid projected directly from a projector;
determining, using an accelerometer, first angle information for the interactive device;
detecting that a first button is pressed, the first button being associated with a first erase signal;
generating a first erase request in response to the first erase signal, wherein the first erase request includes the first coordinate positioning information and the first angle information;
transmitting, via a wireless data communication, the first erase request from the interactive device to the projector;
continually updating the first erase request in response to the first button being continually pressed and the interactive device being moved within the coordinate grid projected;
continually transmitting, via the wireless data communication, the continually updated first erase request, wherein images projected at locations identified in the continually updated erase request are no longer projected after the continually updated first erase request is received at the projector;
detecting that a second sensor is pressed, wherein the second sensor is a nib extending from the interactive device and is placed in physical communication with a projection surface when the second sensor is pressed;
generating a second erase signal based on second coordinate information reflected off of the projection surface and received at the second sensor in response to the second sensor being pressed; and
transmitting the second erase signal from the interactive device to the projector.

9. The method of claim 8 further comprising:
receiving, at a third sensor, third coordinate information from the coordinate projection of the projector;
detecting that a second button is pressed;
sending a write signal when the second button is pressed;
retrieving the third coordinate information from the third sensor in response to the write signal;
retrieving second angle information from the accelerometer in response to the write signal;
generating write information based on the third coordinate information and the second angle information; and
transmitting a write request including the write information to the projector.

10. The method of claim 9 further comprising:
detecting that the second sensor is pressed; and
sending the write signal when the second sensor is pressed.

11. The method of claim 8 further comprising:
receiving, at a third sensor, third coordinate information from the coordinate projection of the projector;
detecting that the third sensor is pressed;
sending a second erase signal when the third sensor is pressed;
retrieving the third coordinate information from the third sensor in response to the second erase signal;
retrieving third angle information from the accelerometer in response to the second erase signal;
generating a second erase request including the third coordinate information and the third angle information; and
transmitting the second erase request to the projector.

12. The method of claim 11 wherein the third sensor extends as a second nib from a second end of the interactive device.

13. The method of claim 12 wherein the first end is on an opposite side of the interactive device from the second end.

14. A method for implementing an interactive device within an interactive projector system, the method comprising:
determining whether a first button or a second button is pressed, the first button being associated with a first erase request and the second button being associated with a write request;
when the first button is pressed:
sending a first erase signal;
determining, at a first sensor, first coordinate positioning information from a coordinate grid projected directly from a projector;

determining, using orientation positioning circuitry, first angle information for the interactive device;

generating the first erase request, wherein the erase request includes the first coordinate positioning information and the first angle information;

transmitting, via a wireless data communication, the first erase request from the interactive device to the projector;

continually updating the first erase request in response to the first button being continually pressed and the interactive device being moved within the coordinate grid projected; and continually transmitting, via the wireless data communication, the continually updated first erase request, wherein images projected at locations identified in the continually updated erase request are no longer projected after the continually updated first erase request is received at the projector; and when the second button is pressed:

sending a write signal;

determining, at a second sensor, second coordinate positioning information from the coordinate grid projected from the projector;

determining, using the orientation positioning circuitry, second angle information for the interactive device;

generating the write request, wherein the write request includes the second coordinate positioning information and the second angle information;

transmitting, via a wireless data communication, the write request from the interactive device to the projector;

detecting that a third sensor is pressed, wherein the third sensor is a nib extending from the interactive device and is placed in physical communication with a projection surface when the second sensor is pressed;

sending a second erase signal when the third sensor is pressed; and determining, at the third sensor, third coordinate positioning information reflected off of the projection surface and received at the third sensor in response to the third sensor being pressed.

15. The method of claim 14 further comprising:

detecting that the second sensor is pressed; and sending the write signal when the second sensor is pressed.

16. The method of claim 14 further comprising:

retrieving the third coordinate positioning information from the third sensor in response to the second erase signal;

retrieving third angle information from the orientation positioning circuitry in response to the second erase signal;

generating a second erase request based on the third coordinate information and the third angle information; and transmitting the second erase request to the projector.

17. The method of claim 16 wherein the second sensor extends as a first nib from a first end of the interactive device.

18. The method of claim 17 wherein the first end is on an opposite side of the interactive device from the second end.

19. The method of claim 14 wherein the orientation positioning circuitry is an accelerometer, a gyroscope, or a combination thereof.

* * * * *